United States Patent
Dai et al.

(10) Patent No.: US 9,124,823 B2
(45) Date of Patent: Sep. 1, 2015

(54) IMAGE SENSOR WITH FAST INTRA-FRAME FOCUS

(71) Applicant: OMNIVISION TECHNOLOGIES, INC., Santa Clara, CA (US)

(72) Inventors: Tiejun Dai, Santa Clara, CA (US); Eiichi Funatsu, Saratoga, CA (US); Donghui Wu, Sunnyvale, CA (US); Zheng Yang, San Jose, CA (US); Xiao Xie, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 31 days.

(21) Appl. No.: 13/950,970

(22) Filed: Jul. 25, 2013

(65) Prior Publication Data

US 2014/0340549 A1    Nov. 20, 2014

Related U.S. Application Data

(60) Provisional application No. 61/825,413, filed on May 20, 2013.

(51) Int. Cl.
*H04N 5/232* (2006.01)
*H04N 5/335* (2011.01)

(52) U.S. Cl.
CPC ..................................... *H04N 5/335* (2013.01)

(58) Field of Classification Search
CPC .................................................. H04N 5/23212
USPC .......................................... 348/245; 396/104
See application file for complete search history.

(56) References Cited

U.S. PATENT DOCUMENTS

| | | | |
|---|---|---|---|
| 8,384,820 B1 | 2/2013 | Lohier et al. | |
| 8,786,625 B2 | 7/2014 | Cote et al. | |
| 2009/0028539 A1* | 1/2009 | Nakahara | 396/104 |
| 2010/0171871 A1 | 7/2010 | Ogino | |

FOREIGN PATENT DOCUMENTS

TW    201233158 A    8/2012

OTHER PUBLICATIONS

TW Patent Application No. 102146196—Taiwanese Office Action and Search Report, with English Translation, issued May 1, 2015 (11 pages).

* cited by examiner

*Primary Examiner* — Joel Fosselman
(74) *Attorney, Agent, or Firm* — Blakely Sokoloff Taylor & Zafman LLP

(57) ABSTRACT

A method of focusing an image sensor includes scanning a first portion of an image frame from an image sensor a first time at a first rate to produce first focus data. A second portion of the image frame from the image sensor is scanned at a second rate to read image data from the second portion. The first rate is greater than the second rate. The first portion of the image frame is scanned a second time at the first rate to produce second focus data. The first focus data and the second focus data are compared, and the focus of a lens is adjusted in response to the comparison of the first focus data and the second focus data.

27 Claims, 3 Drawing Sheets

320

High speed AF read out

| a | b | c | d | 1 | 2 | ... | a-1 | a+1 | a+2 | ... | n |
|---|---|---|---|---|---|---|---|---|---|---|---|
| a | b | c | d | n+1 | n+2 | ... | b-1 | b+1 | b+2 | ... | 2n |
| a | b | c | d | 2n+1 | 2n+2 | ... | c-1 | c+1 | c+2 | ... | 3n |
| a | b | c | d | 3n+1 | 3n+2 | ... | d-1 | d+1 | d+2 | ... | 4n |

FIRST PORTION FOCUS DATA SCANNED AT FIRST RATE ⌣326

SECOND PORTION IMAGE DATA SCANNED AT SECOND RATE ⌣328

IMAGE SENSOR WITH FAST INTRA-FRAME FOCUS

RELATED APPLICATION

This application claims the benefit of U.S. Provisional Application No. 61/825,413, filed May 20, 2013, entitled "IMAGE SENSOR WITH INTRA-FRAME FAST AUTOFOCUS."

BACKGROUND INFORMATION

1. Field of the Disclosure

The present invention relates generally image sensors. More specifically, examples of the present invention are related to image sensors with autofocus.

2. Background

Traditionally, autofocus is done in an inter-frame fashion. The lens of the image sensor moves throughout the autofocusing process. First, a first frame is obtained, and some property of that frame, e.g., contrast value, is obtained. Then, a second frame is obtained, and the same contrast value is obtained. The first and second contrast values are compared to see if the frame is coming into focus or going out of focus. Sharper contrast indicates coming into focus. The direction of the lens movement is adjusted accordingly. If the image is coming into focus, then the lens keeps moving in the same direction. If not, then the direction of the lens movement is reversed in the opposite direction.

The traditional inter-frame autofocusing method is relatively slow, because two image frames must be obtained in order to make a single comparison. The current invention solves this problem by obtaining certain property for comparison within a single frame. Here, autofocus is done in an intra-frame fashion.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Figure 1:
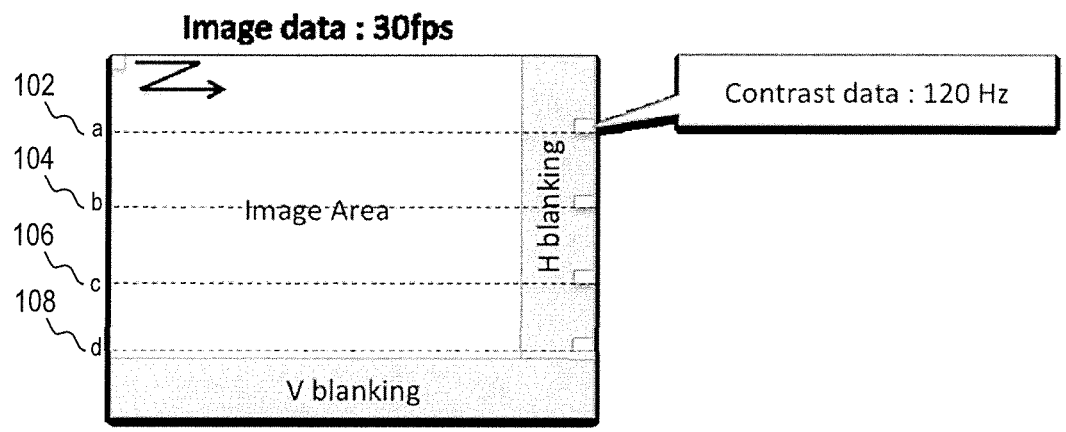
FIG. 1 is a diagram illustrating one example of an image frame from an image sensor having fast intra-frame focus in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

As will be shown, methods and apparatuses directed to an image sensor having fast intra-frame focus are disclosed. In the following description, numerous specific details are set forth in order to provide a thorough understanding of the present invention. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," an embodiment, "one example," or "an example" means that a particular feature, structure, or characteristic described in connection with the embodiment or example is included in at least one embodiment or example of the present invention. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. The following is a detailed description of the terms and elements used in the description of examples of the present invention by referring to the accompanying drawings.

As will be shown, an image sensor in accordance with the teachings of the present invention enables an image sensor to automatically focus an image within a single frame without having to obtain multiple image frames. To illustrate, FIG. 1 is a diagram illustrating one example of an image frame from an image sensor 100 having fast intra-frame focus accordance with the teachings of the present invention. Normally, for a conventional CMOS image sensor with a rolling shutter, an image frame includes a number of horizontal lines, e.g., 500 lines. The conventional CMOS image sensor produces the image frame line by line, with each line being scanned at the same constant speed, e.g., 30 fps (frames per second).

In the example illustrated in FIG. 1, image sensor 100 includes an image frame having a plurality of focusing lines a 102, b 104, c 106, and d 108, which are referred to in this disclosure as a first portion, within the image area of the image frame. The other remaining regular lines within the image area are referred to in this disclosure as the second portion of the image frame. For instance, in one example, the first portion, or the plurality of focusing lines a 102, b 104, c 106, and d 108 are scanned at a faster rate than the second portion, or the regular lines, within the image area of the image frame.

In one example, if a regular line is scanned at a rate of 30 fps, then each of the plurality of focusing lines a 102, b 104, c 106, and d 108 are scanned at a faster rate of 60 fps, 90 fps, 120 fps, or the like. For instance, in one example, the times at which the plurality of focusing lines 102, 104, 106, and 108 are scanned at the faster rate (e.g., 120 fps) are distributed among the times at which the regular lines of the image frame are scanned at the slower rate (e.g., 30 fps) such that after all of the regular lines of the image frame have been scanned with the rolling shutter, all of the plurality of focusing lines a 102, b 104, c 106, and d 108 have been scanned the multiple times at the faster rate.

In an alternate example, if a rolling shutter is utilized, when the rolling shutter reaches the position of one of the plurality of focusing lines a 102, b 104, c 106, and d 108, that focusing line is scanned multiple times at the faster rate (e.g., 120 fps). Normally, when the rolling shutter reaches a regular line, it is scanned only once at a slower normal rate (e.g., 30 fps).

In one example, the total number of scans N of one of the plurality of focusing lines a 102, b 104, c 106, and d 108 per image frame is proportional to the rate at which a focusing line is scanned compared to the rate at which a regular line is scanned. In one example, N is greater than or equal to two. For instance, if a regular line is scanned at a rate is 30 fps and the plurality of focusing lines a 102, b 104, c 106, and d 108 are scanned at a rate of 120 fps (i.e., four times as fast) then each of the plurality of focusing lines a 102, b 104, c 106, and d 108 are scanned N=4 times per image frame. That way, the time to scan the entire image area of the image frame in image sensor 100 will nearly be the same as if the focusing lines were all scanned once at the regular rate of for example 30 fps.

The plurality of focusing lines a 102, b 104, c 106, and d 108 and the multiple scans of each one of the plurality of focusing lines a 102, b 104, c 106, and d 108 within a single frame produce time progression data that may be utilized for autofocusing in accordance with the teachings of the present invention. For example, each one of the plurality of focusing lines a 102, b 104, c 106, and d 108 is scanned four times within a single frame, thereby producing four time points within each one of the plurality of focusing lines a 102, b 104, c 106, and d 108. A contrast value is obtained for each time point with the application of a high contrast filter, and the four contrast values corresponding to the four time points are compared with each other. If the contrast comparison yields an in-focus trend, then the lens will maintain the same direction of movement. If the contrast comparison yields an out-of-focus trend, then the lens will reverse the direction of movement. This feedback adjustment will continue until the best contrast value is achieved to focus the lens in accordance with the teachings of the present invention. In another example, it is appreciated that a phase value may be obtained for each time point to perform a fast intra-frame focus operation in accordance with the teachings of the present invention.

In one example, it is appreciated that each of the plurality of focusing lines a 102, b 104, c 106, and d 108 are not necessarily fixed. In other words, in one example, one or more of the focusing lines a 102, b 104, c 106, and d 108 can be changed to different focusing lines in the image sensor 100 in accordance with the teachings of the present invention. For instance, in one example, control circuitry that controls the image sensor can perform an initial coarse focus operation using the plurality of focusing lines a 102, b 104, c 106, and d 108. After the initial coarse focus operation, the control circuitry controlling the image sensor can then select different locations for the focusing lines in the image sensor 100, which for example have high horizontal contrast, to include in the first portion and will be scanned at the faster first rate for subsequent fine high-speed focus adjustments in accordance with the teachings of the present invention.

Figure 2:
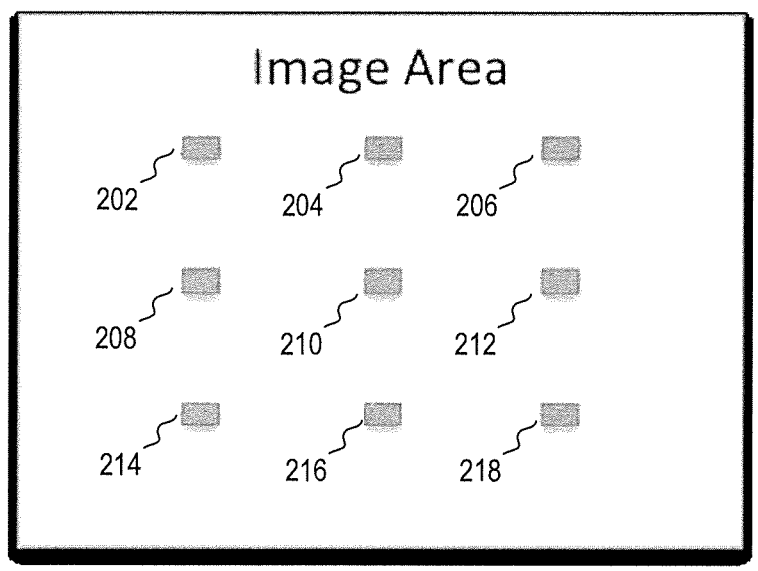
FIG. 2 is a diagram illustrating another example of an image frame from an image sensor having fast intra-frame focus in accordance with the teachings of the present invention.

FIG. 2 is a diagram illustrating another example of an image frame from an image sensor 200 having fast intra-frame focus in accordance with the teachings of the present invention. In the example depicted in FIG. 2, a plurality of focusing dots 202, 204, 206, 208, 210, 212, 214, 216 and 218 are included in a first portion of the image frame instead of the plurality of focusing lines 102, 104, 106 and 108 as depicted in the example of FIG. 1. In one example, it is appreciated that each one of the plurality of focusing dots 202, 204, 206, 208, 210, 212, 214, 216 and 218 may represent a pixel cell or a plurality of pixel cells within an area of image sensor 200 in accordance with the teachings of the present invention. In other words, instead of making a plurality of focusing lines a 102, b 104, c 106, and d 108 special, portions of lines (e.g., dots of pixel cells or designated areas of pixel cells) in the image frame of image sensor 200 of FIG. 2 may be made special to have a faster scanning rate and multiple scans in accordance with the teachings of the present invention.

In the examples of FIG. 1 and/or FIG. 2, the image quality of each image frame obtained by image sensor 100, which contains the plurality of focusing lines a 102, b 104, c 106, and d 108, or the plurality of focusing dots 202, 204, 206, 208, 210, 212, 214, 216 and 218 of image sensor 200, is restored. In particular, in some instances, since the plurality of focusing lines a 102, b 104, c 106, and d 108 and/or the plurality of focusing dots 202, 204, 206, 208, 210, 212, 214, 216 and 218 may have shorter exposure times if the scene is not very bright due to the faster scanning speed, (e.g., approximately one quarter the exposure time due to four times the scanning rate) the exposure or brightness value of these lines and/or dots may be decreased.

In one example, a brightness coefficient a is determined in order to compensate for the faster scanning speed to adjust the exposure or brightness of each of the focusing lines and/or dots to restore image quality according Equation 1:

$$a = \frac{I \times T}{I \times (T - 3g)} \qquad (1)$$

where a is the brightness coefficient, I is the signal intensity, T is the total exposure time of the focusing line or focusing dot, and g is a duration of each timing gap.

To illustrate with respect to the example of FIG. 1, Equation 1 assumes that each of the plurality of focusing lines a 102, b 104, c 106, and d 108 has one quarter of the exposure time of the other regular lines in image sensor 100, and is scanned four times during a single image frame. In the example, there is a short time gap g between the scans of each of the plurality of focusing lines a 102, b 104, c 106, and d 108 because the rolling shutter has to start the line over. Thus, for four scans of a focusing line, there are three timing gaps g between each of the scans.

Continuing with reference to the example depicted in FIG. 1, the exposure or brightness of each pixel in each of the focusing lines and/or dots may be adjusted by first summing the brightness values of all four scans for each one of the plurality of focusing lines a 102, b 104, c 106, and d 108. Second, the brightness coefficient a is then calculated according to Equation 1 above. Then, the brightness value of each pixel in each of the plurality of focusing lines 102, 104, 106, and 108 is multiplied by the brightness coefficient a to obtain the compensated brightness.

Continuing with the example, each of the physical lines may then be interpolated. For instance, assuming that a particular one of the plurality of focusing lines a 102, b 104, c 106, and d 108 is referred to as line B, then the neighboring normal lines from neighboring regions of the second portion of the image sensor that are above and below line B may be referred to as line X and line Y, respectively. The interpolation may then be determined by averaging the brightness values of lines X and Y. Assuming the average of the brightness values of corresponding pixels in lines X and Y is equal to $XY_{avg}$, a Δ value may then be determined by determining the absolute value of the difference between the brightness value of the pixel in line B and the average of the corresponding pixels in lines X and Y according to Equation 2 below:

$$\Delta = |B - XY_{avg}| \quad (2)$$

where B is the brightness value of the pixel in line B and $XY_{avg}$ is the average of corresponding pixels in lines X and Y. If Δ is less than a predetermined value, then replace the pixel's brightness value in line B with the $XY_{avg}$ value. Otherwise, if the Δ is greater than or equal to the predetermined value, then that pixel's B brightness value in line B is used.

Figure 3:
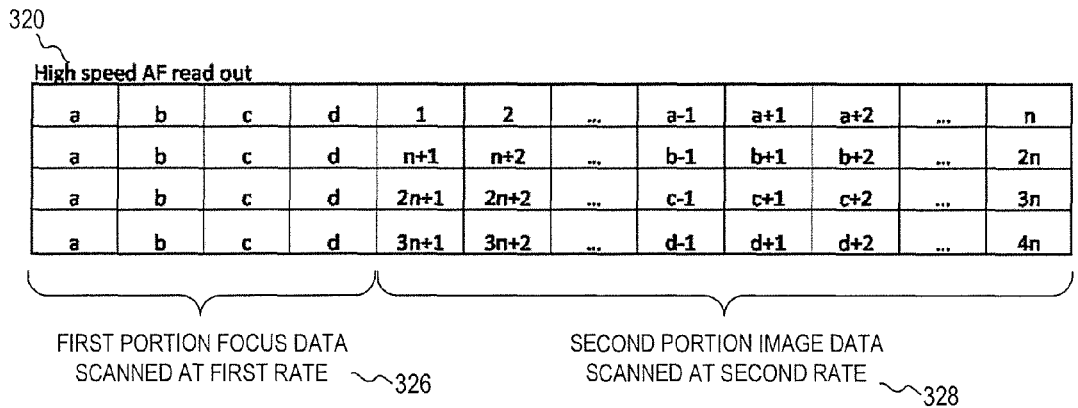
FIG. 3 illustrates an example of a readout table of an image frame that is read out from an image sensor having fast intra-frame focus in accordance with the teachings of the present invention.

FIG. 3 illustrates an example of a readout table 320 of an image frame that is scanned from an image sensor that is focused in accordance with the teachings of the present invention. In the depicted example, the image sensor includes four focusing lines, which are represented in the cells of table 320 as rows a, b, c, and d of the image frame. The other regular lines of the image frame are represented in the cells of table 320 as rows 1, 2, . . . , 4n.

As shown in the example illustrated in FIG. 3, when the image sensor is being focused, focus data is scanned at a first rate 326 from the focusing lines a, b, c, and d of the first portion of the image frame of the image sensor. In one example, the first rate is a faster rate, such as for example 120 fps. Next, after the focusing lines a, b, c, and d are scanned at a first rate 326, image data is scanned at a second rate 328 from regular rows 1, 2, . . . n of the second portion of the image sensor. In one example, the second rate is a slower rate, such as for example 30 fps. In the illustrated example, the process is repeated until the focus data is scanned from the focusing lines a, b, c, and d four times at the first rate, and the image data is scanned from all of the remaining regular lines 1, 2, . . . , 4n once at the second rate in accordance with the teachings of the present invention.

It is appreciated of course that in other examples, the first rate may be other values greater than the second rate, such as for example 60 fps, 90 fps, etc. For instance, if the first rate is 60 fps, then the focusing lines a, b, c, and d are scanned twice (i.e., 60 fps/30 fps=2) at the first rate for each time all of the remaining regular lines of the image sensor are scanned once. Similarly, if the first rate is 90 fps, then the focusing lines a, b, c, and d are scanned three times (i.e., 90 fps/30 fps=3) at the first rate, for each time all of the remaining regular lines of the image sensor are scanned once at the second rate in accordance with the teachings of the present invention.

Thus, referring back to the example depicted in FIG. 3, each one of the plurality of focusing lines a, b, c, and d is scanned four times within a single frame, thereby producing four time points within each one of the plurality of focusing lines a, b, c, and d. A contrast value is obtained for each time point with the application of a high contrast filter, and the four contrast values corresponding to the four time points are compared with each other. If the contrast comparison yields an in-focus trend, then the lens will maintain the same direction of movement. If the contrast comparison yields an out-of-focus trend, then the lens will reverse the direction of movement. This feedback adjustment will continue until the best contrast value is achieved in accordance with the teachings of the present invention. In another example, it is appreciated that a phase value may be obtained for each time point to perform a fast intra-frame focus operation in accordance with the teachings of the present invention.

Figure 4:
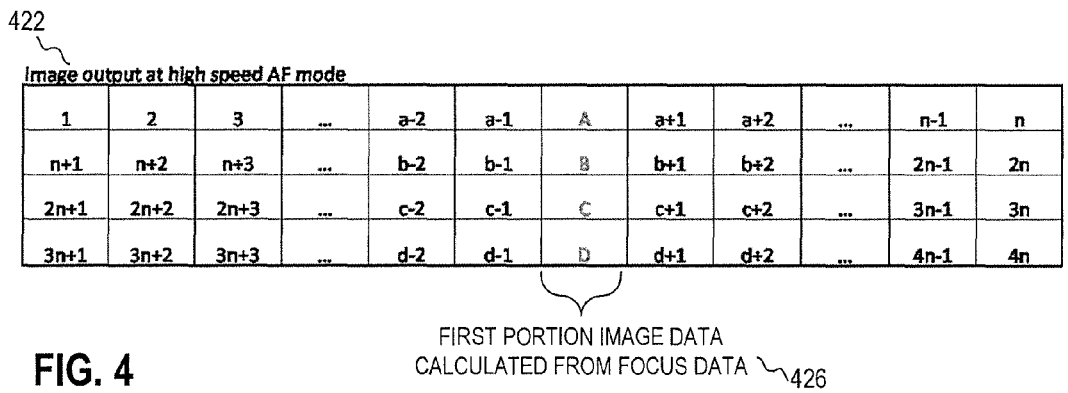
FIG. 4 illustrates one example of image data that is output for an image frame of an image sensor having fast intra-frame focus utilizing techniques in accordance with the teachings of the present invention.

FIG. 4 illustrates one example of image data 422 that is output for an image frame of an image sensor having fast intra-frame focus in accordance with the teachings of the present invention. In the depicted example, the image sensor includes a first portion having four focusing lines a, b, c, and d, as well as a second portion having regular lines 1, 2, . . . , 4n, similar to for example the image sensor described above with respect to FIG. 3. In the depicted example, it is also assumed that the focus data and image data were scanned from the image sensor, using a technique similar to that as described in FIG. 3. Thus, in the example depicted in FIG. 4, the first portion image data 426 for the image frame may be calculated using the previously scanned focus data and/or the previously scanned image data from neighboring lines. In the illustrated example, the image data that is calculated for focusing line a is shown as "A," the image data that is calculated for focusing line b is shown as "B," the image data that is calculated for focusing line c is shown as "C," and the image data that is calculated for focusing line d is shown as "D."

In one example, the, the image data for each focusing line may be calculated using Equations 1 and/or 2 as described above in accordance with the teachings of the present invention. For instance, the focus data scanned for a focusing line multiple times can be used to help calculate the brightness together with coefficient a as described in Equation 1 above to adjust the exposure or brightness of the focusing lines to calculate the image data. In one example, the image data scanned for the neighboring regular lines (e.g., regular rows a−1 and a+1 neighbor focusing line a) may be used to help calculate interpolated image data (e.g., "A" in FIG. 4) for focusing line a according Equation 2 above. The process may be repeated to calculate the image data for each focusing line in accordance with the teachings of the present invention. In one example, it is noted that by scanning the first portion focus data at the first rate 326 prior to scanning the second portion image data at the second rate 328, the focus data scanned from the focusing lines is available to help calculate the image data for the focusing lines when generating the image data 426 output for the image frame in accordance with the teachings of the present invention. It is noted that if interpolation is utilized, there is no need to scan out the focusing lines prior to the normal lines, and there is no need to store them for later reconstruction of image data 426.

Figure 5:
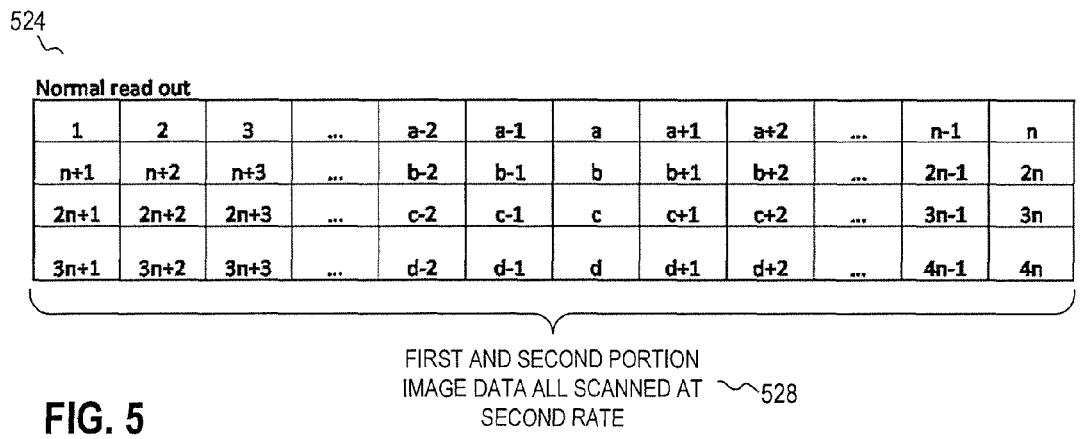
FIG. 5 illustrates another example of image data that is output for an image frame of an image sensor that has already been focused utilizing techniques in accordance with the teachings of the present invention.

FIG. 5 illustrates another example of image data 524 that is output for an image frame of an image sensor, which has already been focused utilizing techniques in accordance with the teachings of the present invention. In the example depicted in FIG. 5, the image sensor is not being focused and the image data may therefore all be scanned at a normal rate, which in one example may be the second rate of 30 fps. For instance, the image sensor may be already focused from a previous image frame utilizing the intra-frame fast focusing techniques described above in accordance with the teachings of the present invention. Therefore the image data from both the first and second portions may all be scanned at the second rate 528 since the image data for the focusing lines a, b, c, and d does not be calculated from the focus data in accordance with the teachings of the present invention.

As was described above in the examples depicted in FIGS. 3-4, the image sensor includes a first portion having four focusing lines a, b, c, and d, as well as a second portion having regular lines 1, 2, . . . , 4n. Thus, assuming for example that the first portion focusing lines a, b, c, and d were scanned at four times a first rate of 120 fps and that the second portion regular lines 1, 2, ... 4n were scanned once at the second rate of 30 fps, it is noted that there is a 12 row difference in the amount of time needed between a normal readout at 30 fps and a high speed focusing readout in which the focusing lines a, b, c, and d, were scanned four times at 120 fps. This is because the focusing lines are only scanned once at 30 fps during a normal readout if the image sensor is not in fast intra-frame focus mode. In this example, the 12 additional rows of readout time that were used during a focus operation are not needed when not focusing. In one example, 12 dummy rows will be read out when reading image data while the image sensor is not being focused to keep the total frame time the same as when the sensor is in fast intra-frame focus mode, in accordance with the teachings of the present invention.

Figure 6:
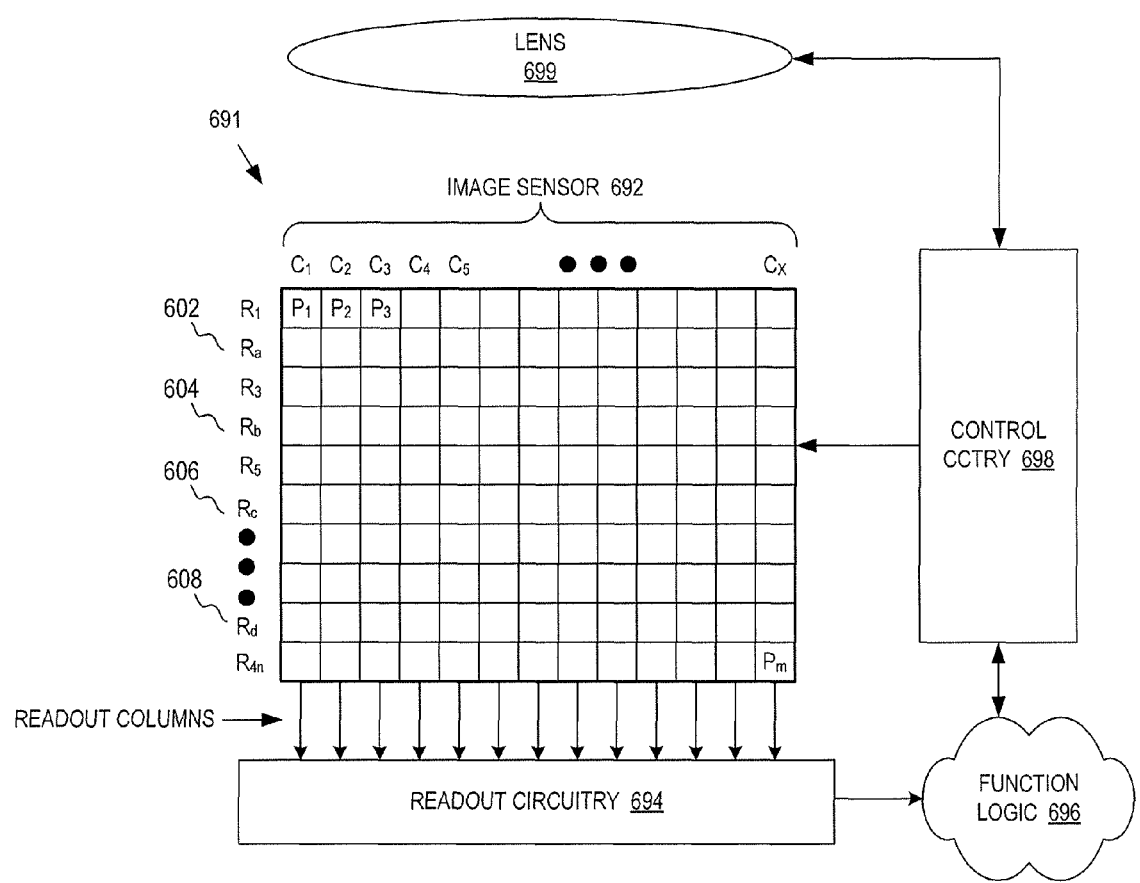
FIG. 6 is a diagram illustrating one example of an imaging system an example image sensor including a first portion with a plurality of focusing lines scanned at a first rate, and a second portion including the remaining regular lines of the image sensor that are scanned at a second rate in the teachings of the present invention.

FIG. 6 is a diagram illustrating one example of an imaging system 691 including an example image sensor 692 having a first portion, including a plurality of focusing lines 602, 604, 606, and 608, and a second portion, including the remaining regular lines of the image sensor in accordance with the teachings of the present invention. As shown in the depicted example, imaging system 691 includes image sensor 692 that is coupled to control circuitry 698 and readout circuitry 694, and is coupled to function logic 696. Imaging system 691 also includes a lens 699, which is adapted to direct an image onto the image sensor 692. In the example, control circuitry 698 is coupled to the readout circuitry through function logic 696, and the lens 699. In one example, the control circuitry 698 is coupled to adjust a focus of the lens 699 in response to comparisons of first focus data and second focus data scanned from the image sensor 692 at a faster first rate utilizing the intra-frame fast focusing techniques discussed above in accordance with the teachings of the present invention.

In one example, image sensor 692 includes a two-dimensional (2D) array of image sensor pixel cells (e.g., pixels $P_1$, $P_2$, $P_3$, ..., $P_m$). It is noted that image sensor 692 may be an example of image sensor 100 of FIG. 1, and the focus data and the image data may be scanned as described above, and that similarly named and numbered elements referenced below are coupled and function similar to as described above. As illustrated, each pixel cell is arranged into a row (e.g., rows $R_1$ to $R_{4n}$) and a column (e.g., columns C1 to Cx) to acquire focus data and image data of a person, place, object, etc., which can then be used to render a 2D image of the person, place, object, etc.

It is appreciated that a first portion of image sensor 692 includes a plurality of focusing lines, which are illustrated in FIG. 6 as rows $R_a$ 602, $R_b$ 604, $R_c$ 606, and $R_d$ 608, and may be considered as examples of the plurality of focusing lines a 102, b 104, c 106, and d 108 of FIG. 1, in accordance with the teachings of the present invention. Thus, in the depicted example, focus data is scanned multiple times at a faster first rate from rows $R_a$ 602, $R_b$ 604, $R_c$ 606, and $R_d$ 608, for each time that image data is scanned from the remaining regular rows $R_1$ ... $R_{4n}$ at the slower second rate in accordance with the teachings of the present invention.

In the depicted example, control circuitry 698 is coupled to control the focusing of lens 699 in response to comparisons of the focus data scanned from the focusing lines, including rows $R_a$ 602, $R_b$ 604, $R_c$ 606, and $R_d$ 608, of image sensor according to the intra-frame fast focusing processing as discussed above in accordance with the teachings of the present invention. The multiple scans rows $R_a$ 602, $R_b$ 604, $R_c$ 606, and $R_d$ 608 within a single frame produce time progression data that may be utilized by control circuitry 698 for intra-frame fast focusing in accordance with the teachings of the present invention. For example, each one of the rows $R_a$ 602, $R_b$ 604, $R_c$ 606, and $R_d$ 608 is scanned four times within a single frame, thereby producing four time points within each one of the rows $R_a$ 602, $R_b$ 604, $R_c$ 606, and $R_d$ 608. A contrast value is obtained for each time point with the application of a high contrast filter, and the four contrast values corresponding to the four time points are compared with each other. If the contrast comparison yields an in-focus trend, then control circuitry 698 will maintain the same direction of movement lens 699. If the contrast comparison yields an out-of-focus trend, then control circuitry 698 will reverse the direction of movement of lens 699. This feedback adjustment will continue until the best contrast value is achieved to focus lens 699 in accordance with the teachings of the present invention. In another example, it is appreciated that a phase value may be obtained for each time point to perform a fast intra-frame focus operation in accordance with the teachings of the present invention.

In one example, image data that has been scanned from each pixel cell $P_1$, $P_2$, $P_3$, ..., $P_m$ is transferred to function logic 696. In various examples, readout circuitry 694 may include amplification circuitry, analog-to-digital (ADC) conversion circuitry, or otherwise. Function logic 696 may simply store the image data or even manipulate the image data by applying post image effects (e.g., crop, rotate, remove red eye, adjust brightness, adjust contrast, or otherwise). In one example, readout circuitry 694 may scan a row of image data at a time along readout column lines (illustrated) or may scan the image data using a variety of other techniques (not illustrated), such as a serial readout or a full parallel readout of all pixels simultaneously.

In one example, control circuitry 698 is coupled to image sensor 692 to control operational characteristics of image sensor 692 as well as perform the intra-frame fast autofocus of lens 699 as discussed above. In one example, control circuitry 698 is coupled to generate a shutter signal for controlling image acquisition for each pixel cell. In the example, the shutter signal is a rolling shutter signal such that each row, column, or group of pixels is sequentially enabled during consecutive acquisition windows.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A method of focusing an image sensor, comprising:
   scanning a first portion of an image frame from an image sensor a first time at a first rate to produce first focus data;

scanning a second portion of the image frame from the image sensor at a second rate to read image data from the second portion, wherein the first rate is greater than the second rate;

scanning the first portion of the image frame a second time at the first rate to produce second focus data, wherein the first rate is N times greater than the second rate, wherein N is greater than or equal to two, and wherein the first portion is scanned N times for each time the second portion is scanned during a focus operation;

comparing the first focus data and the second focus data; and adjusting a focus of a lens in response to the comparison of the first focus data and the second focus data.

2. The method of claim 1, wherein the first portion of the image frame includes a focusing line.

3. The method of claim 1, wherein the first portion of the image frame includes a focusing dot.

4. The method of claim 1, wherein the first portion of the image frame includes a pixel of the image sensor.

5. The method of claim 1, wherein the first portion of the image frame includes an area of pixels of the image sensor.

6. The method of claim 1 wherein the first and second focus data comprise first and second contrast data, respectively.

7. The method of claim 1 further comprising changing a location of the first portion of the image frame to a different location.

8. The method of claim 1 further comprising calculating image data for the first portion in response to the first and second focus data.

9. The method of claim 8 wherein calculating the image data for the first portion comprises adjusting a brightness of the first and second focus data.

10. The method of claim 8 wherein calculating the image data for the first portion comprises averaging image data scanned from neighboring regions of the second portion at the second rate.

11. The method of claim 1 further comprising scanning the first and second portions at the second rate to read image data for each frame from the image sensor when the image sensor is not being focused.

12. The method of claim 11 further comprising reading out additional dummy rows when reading image data while the image sensor is not being focused to keep a total frame time equal to when the image sensor is being focused.

13. An imaging system, comprising:
a lens;
an image sensor having an image frame including at least a first portion and a second portion, wherein the lens is adapted to direct an image onto the image sensor;
readout circuitry coupled to the control circuitry and the image sensor to readout focus data and image data from the image sensor, wherein the readout circuitry is coupled to readout first focus data that is scanned at a first rate from the first portion of the image frame from the image sensor a first time, wherein the readout circuitry is coupled to readout image data that is scanned at a second rate from the second portion of the image frame from the image sensor, wherein the readout circuitry is coupled to readout second focus data that scanned at the first rate from the first portion of the image frame from the image sensor a second time, wherein the first rate is N times greater than the second rate, wherein N is greater than or equal to two, and wherein the first portion is scanned N times for each time the second portion is scanned during a focus operation; and control circuitry coupled to the readout circuitry and the lens, wherein the control circuitry is coupled to adjust a focus of the lens in response to a comparison of the first focus data and the second focus data from the readout circuitry.

14. The imaging system of claim 13 further comprising function logic coupled to the readout circuitry and the control circuitry to store the image data readout from the image sensor.

15. The imaging system of claim 13, wherein an exposure time of the first portion of the image frame is different from an exposure time of a neighboring region of the second portion of the image frame.

16. The imaging system of claim 13, wherein an exposure time of the first portion of the image frame is less than an exposure time of a neighboring region of the second portion of the image frame.

17. The imaging system of claim 13, wherein the first portion of the image frame includes a focusing line.

18. The imaging system of claim 13, wherein the first portion of the image frame includes a focusing dot.

19. The imaging system of claim 13, wherein the first portion of the image frame includes a pixel of the image sensor.

20. The imaging system of claim 13, wherein the first portion of the image frame includes an area of pixels of the image sensor.

21. The imaging system of claim 13, wherein the first and second focus data comprise first and second contrast data, respectively.

22. The imaging system of claim 13, wherein the control circuitry is coupled to change a location of the first portion of the image frame to a different location.

23. The imaging system of claim 13, wherein the control circuitry is further coupled to calculate image data for the first portion in response to the first and second focus data.

24. The imaging system of claim 23, wherein the control circuitry is further coupled to adjust a brightness of the first and second focus data to calculate the image data for the first portion.

25. The imaging system of claim 23, wherein the control circuitry is further coupled to average image data scanned from neighboring regions of the second portion at the second rate to calculate the image data for the first portion.

26. The imaging system of claim 13, wherein the readout circuitry is coupled to readout image data that is scanned at the second rate from both the first portion and the second portion of the image frame from the image sensor into the frame memory when the image sensor is not being focused.

27. The imaging system of claim 26, wherein the readout circuitry is further coupled to readout additional dummy rows when reading image data while the image sensor is not being focused to keep a total frame time equal to when the image sensor is being focused.

* * * * *